UNITED STATES PATENT OFFICE.

ALFRED SWAN, OF GATESHEAD, COUNTY OF DURHAM, ENGLAND.

GLASS BULB OR GLOBE FOR INCANDESCENT ELECTRIC LAMPS.

SPECIFICATION forming part of Letters Patent No. 276,924, dated May 1, 1883.

Application filed July 20, 1882. (No model.) Patented in England June 19, 1882, No. 2,898.

*To all whom it may concern:*

Be it known that I, ALFRED SWAN, a subject of the Queen of Great Britain, and residing in the borough of Gateshead, in the county of Durham, England, have invented a certain Improvement in Glass Bulbs or Globes for Incandescent Electric Lamps, (for which I have obtained a patent in Great Britain No. 2,898, dated 19th June, 1882,) of which the following is a specification.

This invention relates to the manufacture of the glass bulbs or globes for containing the carbon or other filament in incandescent electric lamps; and it has for its object to produce a more perfect article at a less cost than heretofore.

The manner of making these bulbs or globes heretofore has been to blow them from glass tubing by the well-known glass-blowing process. It is impossible by this means to produce bulbs uniform in size and shape, which is of the greatest importance in incandescent electric lamps. With the greatest care defects in shape and irregularities in outline cannot be avoided. Moreover, the blowing can only be done by skilled labor at great expense, the cost being further enhanced by the cost of the tubing, which is itself a manufactured article. It has also been proposed to blow the bulbs directly from molten or pot glass; but the bulbs or globes so formed would be open to the objections stated.

In the present invention the glass is blown into molds, (made or faced with lubricating or anti-friction material—such as graphite or plumbago,) and the article is rotated in the mold to prevent the formation of a rib or mark of the mold. Incandescent-light bulbs made in this way are distinguished by their regularity and uniformity from those heretofore made, they being of perfect shape and smooth finish, with walls of equal thickness—all features greatly desired in incandescent lights. At the same time they can be made from raw unmanufactured glass, and do not require the same class of skilled labor as in the case of the blown bulbs.

It may be observed that it is not new to make molds for glass articles of graphite and similar materials, neither is it new to turn the article blown in the mold; but it is new to manufacture the bulbs or globes for incandescent electric lamps in this way, and the globes or bulbs so made constitute a new article of manufacture. My invention therefore involves the application of the blowing and rotation in molds to the manufacture of incandescent-lamp bulbs and the production of an improved bulb or globe as a new article.

The mold is or may be made of a mixture of coke, graphite, or plumbago, or other form of carbon mixed with tar, or of coke, graphite, plumbago, or other form of carbon mixed with moist clay or other suitable cementing material. The coke, graphite, plumbago, or other form of carbon is finely pulverized and then mixed with the tar or with the clay, as the case may be, into a paste, and is then compacted into a solid mass by pressure, and is then baked in a furnace to give it the requisite hardness and stability. The tar and clay may be used together for admixture with the carbon, if desired. I have found that two parts of pulverized coke to one part of pulverized plumbago or graphite, with just sufficient tar or moist clay, or both, to bring the mass to the consistency of a stiff paste, answer well in practice; but I do not limit myself thereto.

The mold is formed or turned of the shape (requisite to give the desired shape to the bulb or globe) either before or after baking. The said mold is formed in halves or parts, inclosed preferably in an outer box of wood or other material, the parts being hinged or otherwise truly fitted together. An opening or "get" is left, into which the molten glass upon the blow-pipe or blowing-iron is introduced, and the glass is then blown into the mold and the blow-pipe or blowing-iron (or the mold or both the blow-pipe or blowing-iron and the mold) rotated, so that the bulb or globe is produced of a very perfect figure and without mold-marks.

I have described the mold of graphite or plumbago by way of illustration. It is not of the essence of the invention. Other like material—such as soapstone or steatite—could be used instead, the interior being hollowed out in any suitable way.

Having now fully described my said inven- tion and the manner of carrying the same into effect, what I claim is—

The manufacture of the herein-described molded bulbs or globes for incandescent electric lamps by blowing the glass and rotating it in separable closed molds lined with antifriction material, said molded bulbs or globes having the characteristics described.

In testimony whereof I have signed my name to this specification in the presence of two subscribing witnesses.

ALFRED SWAN.

Witnesses:
ROBT. GREENE WALDON,
*Solicitor, Newcastle-on-Tyne.*
R. W. JOHNSON,
*Clerk to U. S. Consul, Newcastle-on-Tyne.*